United States Patent [19]

Umeda

[11] 4,422,419
[45] Dec. 27, 1983

[54] ROTARY INTERNAL COMBUSTION ENGINE

[76] Inventor: Soei Umeda, 10-14, Mitsuyaminami 3-chome, Yodogawa-ku, Osaka-shi, Japan

[21] Appl. No.: 173,494

[22] Filed: Jul. 29, 1980

[30] Foreign Application Priority Data

Oct. 15, 1979 [JP] Japan ................................ 54-133343

[51] Int. Cl.³ ............................................. F02B 53/08
[52] U.S. Cl. .................................... 123/235; 123/236; 418/150; 418/263
[58] Field of Search ................ 123/235, 236; 418/150, 418/258, 255, 260, 261, 263

[56] References Cited

U.S. PATENT DOCUMENTS

| | | | |
|---|---|---|---|
| 727,434 | 5/1903 | Pettengill | 418/260 X |
| 1,255,865 | 2/1918 | Doane | 123/235 |
| 1,792,026 | 2/1931 | Nichols | 123/235 |
| 2,359,903 | 10/1944 | Fanning | 418/255 |
| 2,511,441 | 6/1950 | Loubiere | 123/235 |
| 4,133,617 | 1/1979 | Reynaud | 418/150 |

FOREIGN PATENT DOCUMENTS

| | | | |
|---|---|---|---|
| 251816 | 10/1912 | Fed. Rep. of Germany | 418/255 |
| 528731 | 8/1921 | France | 123/236 |
| 770389 | 6/1934 | France | 123/235 |

*Primary Examiner*—Michael Koczo
*Attorney, Agent, or Firm*—Wenderoth, Lind & Ponack

[57] ABSTRACT

A prime mover which is constituted by a compressor casing having a combustion gas inlet, a compressor rotor rotatably mounted in the compressor casing and having at least one vane movable radially of the rotor and resiliently sealingly engaged with the inside surface of the wall of the compressor casing for forming a compression chamber therein, a prime mover casing adjacent the compressor casing and having an exhaust outlet therein and a spark plug mounted thereon, a prime mover rotor rotatably mounted in the prime mover casing and having at least one vane movable radially of the rotor and resiliently sealingly engaged with the inside surface of the wall of the prime mover casing for forming a combustion chamber therein, the rotors being connected for causing them to rotate together, and a passage opened and closed by the rotation of the rotors for passing compressed combustion gas from the compressor casing to the prime mover casing at predetermined intervals for being ignited by the spark plug.

3 Claims, 18 Drawing Figures

ROTARY INTERNAL COMBUSTION ENGINE

BACKGROUND OF THE INVENTION AND PRIOR ART

The rotary type prime mover of the present invention is an improvement of the prime mover which is the subject of U.S. application Ser. No. 236,289, filed Feb. 19, 1981, which in turn is a continuation-in-part of U.S. application Ser. No. 37,333, now abandoned.

In the device of said application, however, each cycle of induction, compression, firing and exhaust is performed in one casing. That is to say, the opening or closing of the casing, or the induction or exhaustion of air is performed in one casing.

But there are some disadvantages in the device of said application. Both the induction valve and the exhaust valve of the said device tend to wear out and also tend to get out of order so they are not opened or closed at an exact time. Thus, it is difficult for the internal combustion engine of the said application to maintain air-tightness and to perform its operation efficiently. In order to overcome such disadvantages, the present inventor made a further study of this engine, which resulted in the present invention.

OBJECTS AND BRIEF SUMMARY OF THE INVENTION

A first object of the invention is to provide a prime mover in the form of a rotary engine which can maintain a high degree of air-tightness during both the compression cycle and the firing cycle so as to obtain a highly efficient machine.

A second object of the invention is to provide such an engine in which automatic induction and exhaustion are achieved by the rotation of rotors in a compressor casing and a prime mover casing so as to make it possible to dispense with the induction and an exhaust valves.

A third object is to simplify the construction of the engine, which also reduces the possibility of the engine getting out of order.

A fourth object is to provide a machine which is relatively inexpensive.

To this end, the present invention provides a gas compressor casing which performs induction and compression, and a prime mover casing which performs firing and exhaust. A gas passage is provided between the two casings to connect with each other.

Thus, by providing a gas intake at the front part of a compressor chamber where induction and compression are performed and an exhaust port at the back part of the prime mover casing where the firing and exhaust are performed, the rotation of the rotor in each casing performs an automatic induction and exhaust. Thus, this engine need not be provided with an induction valve or an exhaust valve, and it is easy for this engine to maintain air-tightness during both compression and firing cycles. Therefore, the present engine is very efficient, inexpensive, and has a simple construction.

BRIEF DESCRIPTION OF THE DRAWINGS

The attached drawings show embodiments of the invention.

In the drawings, the numeral 1 designates a compressor casing. The lower part of the inner wall is circular in cross-section while the upper part is approximately elliptical with its short axis arranged in the vertical direction and is smoothly connected to the said circular portion. The numeral 2 designates a prime mover casing which is above the said compressor casing and connected thereto to form a unitary engine casing. The upper part of the inner wall is elliptical in cross-section with the short axis of the ellipse arranged vertically and the lower part is circular and is smoothly connected to the said elliptical part. As shown in FIG. 1A, a cylindrical compressor rotor 3 for compressing combustion gas has several sections with different diameters. A prime mover rotor 4 is provided which is similar in shape to the rotor 3, and is rotated by the firing of the combustion gas. A rotor 36 connects the compressor rotor with the prime mover rotor 4 on the same shaft. Shafts 37 and 38 on the ends of the rotor 36 and shafts 7 and 8 on the ends of the rotor 4 are supported by end walls 9 and 10 of the casings 1 and 2 and the rotors 3 and 4 to rotate in close contact with the circular cross-section parts of the casings 1 and 2 respectively. Vanes 39 and 12 having shape as shown in FIG 1B are radially slidable in a groove 38 extending through the center of the rotor 36 and a plate spring 14 is positioned between the vanes urging them radially outwardly. Vanes 39 are resiliently urged by the plate springs 14 to cause the outer ends to contact the elliptical cross-section parts of the casings 1 and 2 respectively, and maintain the air-tightness of a combustion chamber 18 in which firing takes place and from which the products of combustion are exhausted, and of a compression chamber 19 respectively, dividing the insides of the casings 1 and 2 into two parts respectively.

Figure 1A:
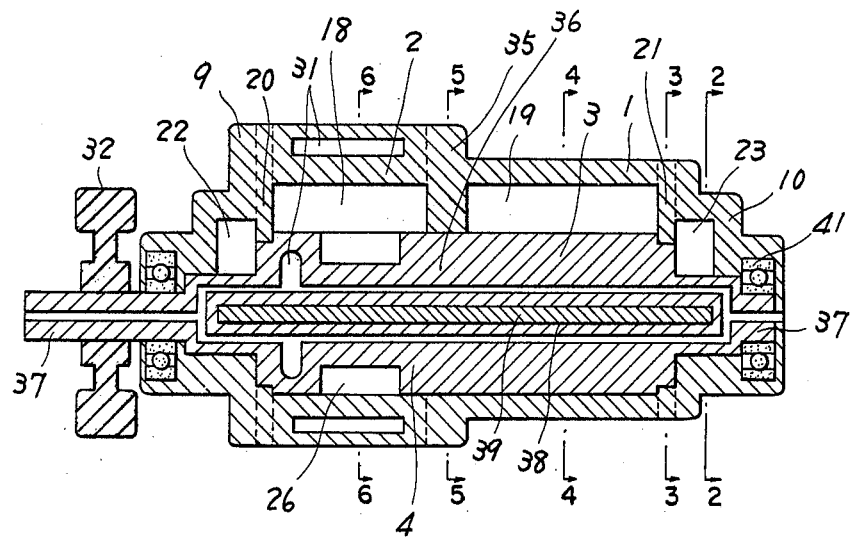
FIG. 1A is a longitudinal sectional view through the shaft of rotors of a first embodiment of the engine according to the invention.
Figure 1B:
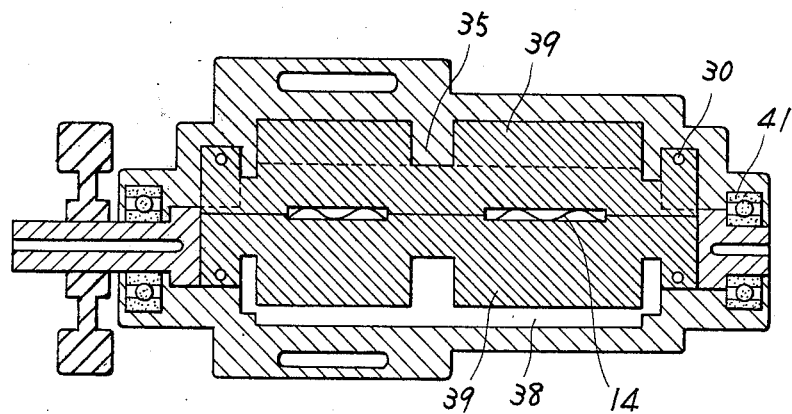
FIG. 1B is a view similar to FIG. 1A with the rotors in different positions.
Figure 2:
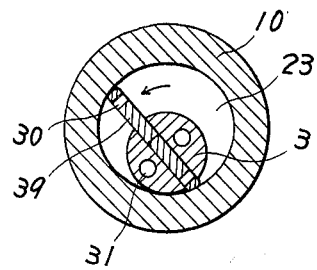
FIG. 2 is a sectional view taken along the line 2—2 of FIG. 1A.
Figure 3:
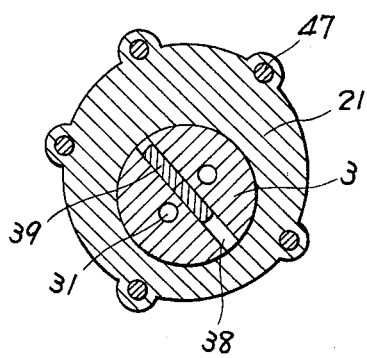
FIG. 3 is a sectional view taken along the line 3—3 of FIG. 1A.
Figure 4:
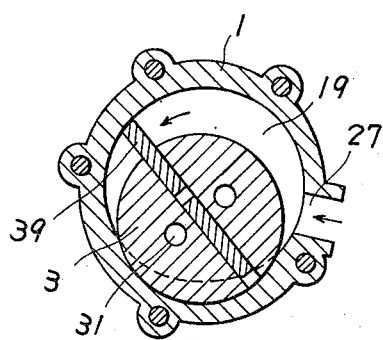
FIG. 4 is a sectional view taken along the line 4—4 of FIG. 1A.
Figure 5:
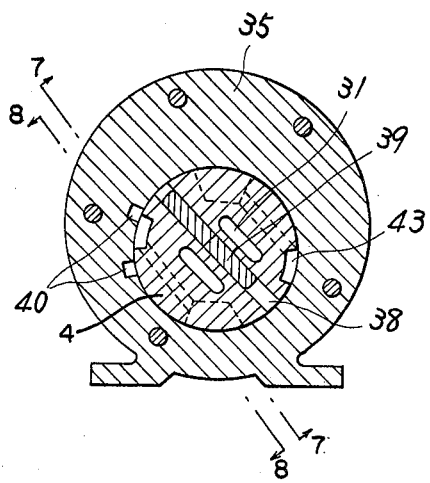
FIG. 5 is a sectional view taken along the line 5—5 of FIG. 1A.
Figure 6:
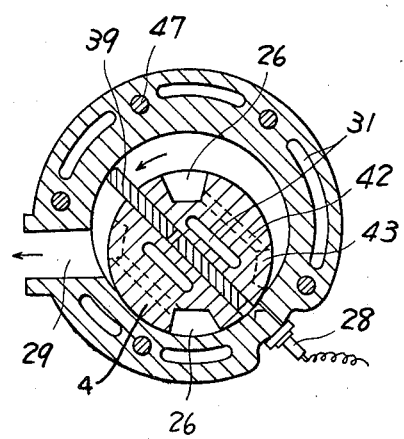
FIG. 6 is a sectional view taken along the line 6—6 of FIG. 1A.
Figure 7:
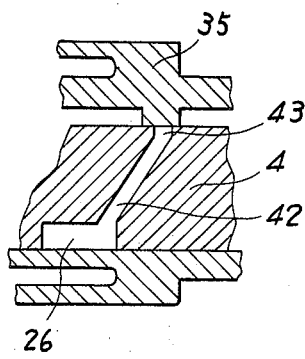
FIG. 7 is a sectional view taken along the line 7—7 of FIG. 5.
Figure 8:
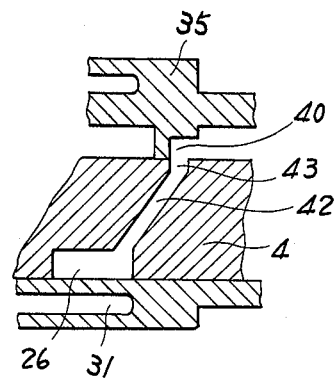
FIG. 8 is a sectional view taken along the line 8—8 of FIG. 5.

The numerals 20 and 21 designate intermediate walls provided adjacent the opposite ends of casings 1 and 2 which define vane guide chambers 22 and 23 between them and the end walls 9 and 10 at the opposite ends of the combustion chamber 18 and the compression chamber 19 respectively. Vane guide chambers 22 and 23 have inner walls with cross-sectional shapes which are approximately elliptical similar to the upper parts of the casings 1 and 2. Compressed gas receiving grooves 26 are provided on diametrically opposite parts at the middle. Gas for combustion is drawn into compressor casing 1 through a gas induction port 27 just past, in the direction of rotation, the gas passage 42 and is compressed by the vanes 39 in the compression chamber during the rotation of the rotor 36, and as shown in FIG. 8, only when a groove 43 is aligned with recess 40 can the gas compressed in the compressor chamber 19 in the casing 1 pass through the corresponding hole 42, and be forcibly introduced into the corresponding compressed gas delivery recess 26. Then the rotor 36 rotates and the spark plug 28 installed in the operating chamber 18 in the casing 2 ignites the compressed gas in the compressed gas delivery recess 26 immediately after it is closed at the compressor chamber end as shown in FIG. 7. The ignition leads to the explosion of the compressed gas in the said groove 26, which in turn pushes the vanes 39 to forcibly rotate the rotor 36. With the rotation of the rotor 4, the expanded gas in the combustion chamber 18 is discharged through the exhaust port 29 provided in the operating chamber 18 just ahead of, in the direction of rotation of the rotor, the position of the motor as shown in FIG. 6.

A plurality of air holes 30 are provided in the vanes 39 in the vane guide chambers 22 and 23. Said holes 30 facilitate the rotation of the vanes 39 in the vane guide chambers 22 and 23.

Figure 12:
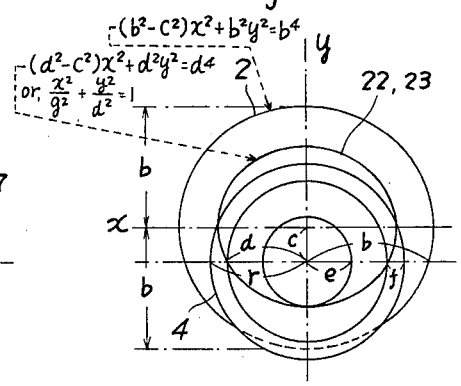
Figure 13:
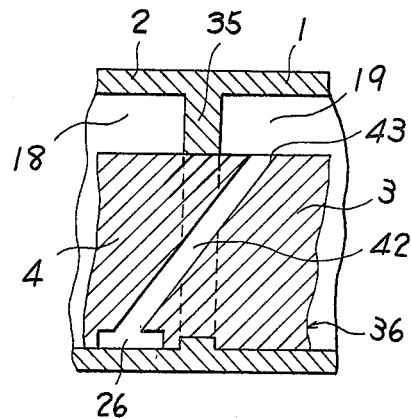
FIG. 13 is a partial longitudinal sectional view of a second embodiment of the engine showing the gas introducing port in the rotors.

FIG. 12 shows the equations for the elliptical cross-section parts of the casings 1 and 2 and the vane guide and the length of the short axis be "2b", and the distance between the center of the elliptical part and the center of the rotor be "c".

Then a shape of the ellipse will be given by $$(b^2 - c^2)x^2 + b^2y^2 = b^4 \tag{1}$$

But according to the present invention, the circumference of the elliptical part should be made smaller in the radial direction towards the center of the rotor. In other words, if the value $\delta$ in the following Equation (2) is substracted from the diametrical dimensions of the ellipse of Equation (1), the vanes will ideally rotate in close contact with the inner surfaces of the elliptical cross-section parts of the casings 1 and 2 without moving toward or away from each other.

$$\delta = 2b \left\{ \sqrt{1 + \frac{c^4 \tan^2\theta}{(b^2 + b^2\tan^2\theta - c^2)^2}} - 1 \right\} \tag{2}$$

where "$\theta$" is an angle in radians between the vanes and the "x" axis.

If the vane guide chambers 22 and 23 are made smaller, the equation therefor uses the dimensions shown in FIG. 12. Here, "e" is radius of the rotor 36 in the vane guide chambers 22 and 23. Then, when assembling the machine with such dimensions, and in order to insert the vanes 39 already inserted in the groove 38 of the rotor 36 into the holes in the intermediate walls 20 and 21, the relation between "e" and the radius of the holes in the intermediate walls a is represented by the following equation:

$$d = e + c \tag{3}$$

Also, the approximate equation for the elliptical part of the vane guide chambers 22 and 23 can be approximated, in the same manner as stated before, as shown in FIG. 12, by the following equation:

$$(d^2 - c^2)x^2 + d^2y^2 = d^4 \text{ or} \tag{5}$$

$$\frac{x^2}{g^2} + \frac{y^2}{d^2} = 1 \left( g = d + \frac{b^2}{b^2 - c^2} - b \right)$$

In this case, however, according to the present invention the curvature of the inner wall of the vane guide chambers 22 and 23 should be corrected somewhat manually or by calculation based on Equations 1 and 2.

Cooling passages 31 are provided in the casing 2 and the rotor 36 and cool water or oil is pumped therethrough. A flywheel 32 is provided on one shaft 37 of the rotor 4, and facilitates a smooth rotation of the rotor 36. The numeral 33 designates a base upon which the engine is installed.

Figure 10:
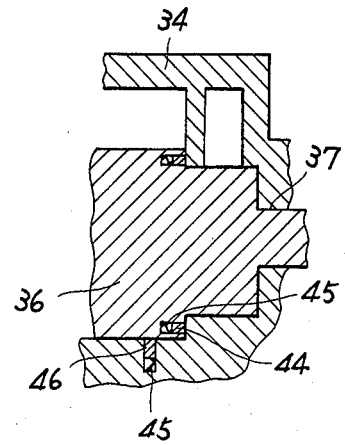
Figure 11:
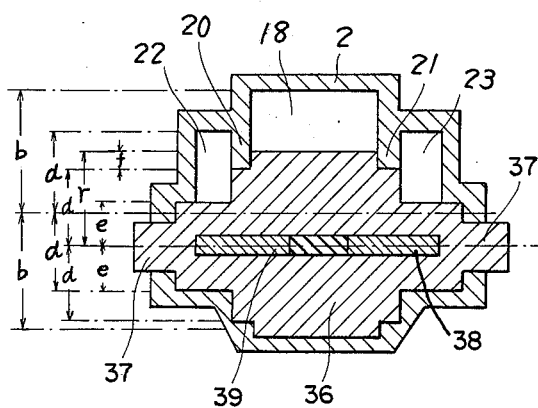
FIGS. 11 and 12 are diagrammatical views showing the dimensional relations of the elements of the prime mover casing.

The numeral 40 designates a recess in the central wall 35 as shown in FIG. 10. Gas introducing holes 42 are provided in the rotor and extend parallel with the vane grooves 38 and extend from compression gas receiving grooves 43, provided in the surface of the rotor portion 4 on diametrically opposite sides thereof and opposed to the recess 40, to gas delivery recesses provided in the surface of the rotor portion 3 at diametrically opposite sides and opening into the casing 2.

As shown in FIG. 8, only when a groove 43 is aligned with recess 40 can the gas compressed in the compressor chamber 19 in the casing 1 pass through the corresponding hole 42, and be forcibly introduced into the corresponding compressed gas delivery recess 26. Then the rotor 36 rotates and the spark plug 28 installed in the operating chamber 18 in the casing 2 ignites the compressed gas in the compressed gas delivery recess 26 immediately after it is closed at the compressor chamber end as shown in FIG. 12. The ignition leads to the expolsion of the compressed gas in the said groove 26, which in turn pushes the vanes 39 to forcibly rotate the rotor 36. With the rotation of the rotor 4, the expanded gas in the combustion chamber 18 is discharged through the exhaust port 29 provided in the operating chamber 18 just ahead of, in the direction of rotation of the rotor, the position of the rotor as shown in FIG. 6.

FIGS. 13 and 14A–14D show another embodiment in which a compressor rotor portion 3' and a prime mover rotor portion 4' are arranged in series with each other. Compressed gas delivery recesses 26' are provided in the surface of the prime rotor portion 4' at diametrically opposite positions. The gas holes extend from the gas delivery recesses 26' parallel with vane groove 38. The intake openings 43 of the gas holes 42 are provided at diametrically opposite points on the surface of the compressive rotor portion 3' and open in opposite directions respectively. Thus, the gas holes 42 connect the combustion chamber 18' with the compressor chamber 19'.

Figure 14A:
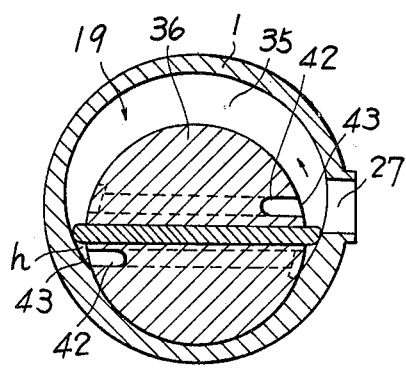
FIGS. 14A through 14D are sectional views of the casings in this embodiment, FIG. 14A showing the compression chamber in the last stage of an induction and compression process, FIG. 14B showing the compression chamber in the early stage of an induction and compression process, FIG. 14C showing the operating chamber in a stage immediately after firing and FIG. 14D showing the operation chamber in the early stage of an expansion and exhaust cycle.
Figure 14B:
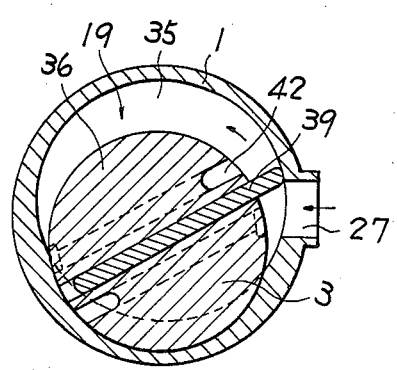
Figure 14C:
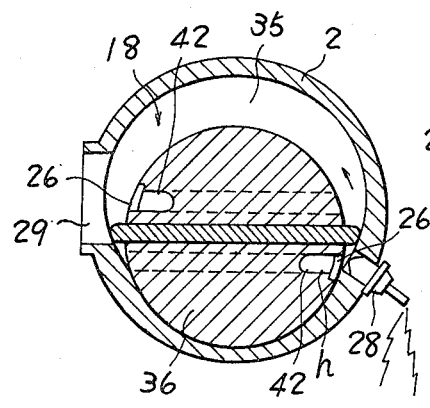
Figure 14D:
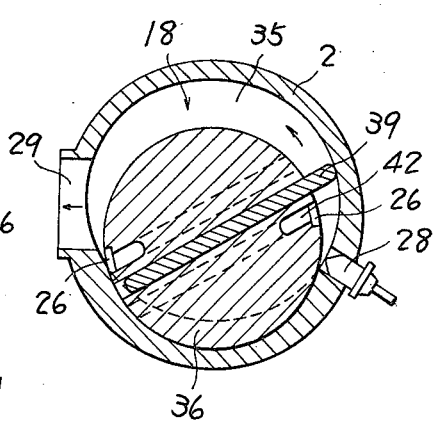

The operation of this embodiment is as follows: gas "h" as compressed casing 1' in FIGS. 14A is forced into a compressed gas delivery recess 26' in FIG. 14C through the gas hole 42. The compressed gas "h" is ignited by the spark plug 28 and then exploded and expanded. The exploded and expanded gas "h" forcibly pushes the vane 39, as shown in FIG. 14D, which in turn rotates the rotor 36.

With the rotation of the rotor 36, the expanded gas "h" in the combustion chamber 18 is exhausted through the exhaust port 29. Meanwhile, with the rotation of the rotor 36, a combustion gas, which is introduced from a gas delivery duct 27 into the compression chamber 19 in FIG. 14A, is compressed as shown in FIG. 14B, and then the rotor returns to the state as is shown in FIG. 14A to complete one cycle.

Unlike the embodiment as shown in FIGS. 7 and 8, this embodiment has no recess 40 to open into the recess 43 of the gas hole 42. Besides, in this embodiment the construction of the device can be made simpler, and it is easier for the device to maintain air-tightness. What is more, if the compression ratio is raised and if the spark plug 28 is replaced with a fuel spray nozzle, the device of this embodiment can be used as a crude petroleum combustion engine.

Figure 9:
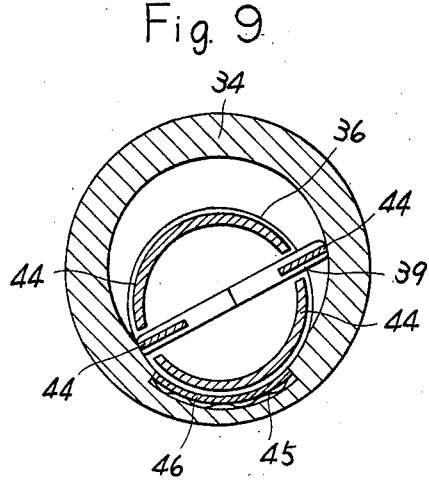
FIGS. 9 and 10 are respectively transverse and longitudinal sectional views of a seal attaching device for increasing gas-tightness.

As shown in FIGS. 9 and 10, end seals 44 and 44 are provided at both ends of the rotor 36 and the vanes 39, and also a seal spring 45 and an under seal 46 is provided in the lower circular cross-section part of the casing 34. The air-tightness can thus be further improved in any of the embodiments.

The present invention has the construction as described hereinabove. As compared with a conventional reciprocating internal combustion engine, the present engine has neither an inducction valve nor an exhaust valve, can easily maintain air-tightness, and is small in size and light in weight. Besides, as practically all of the explosive power of the gas burned in the present engine can be converted into rotational power, it can operate at high pressure and is efficient, and thus a great amount of saving in fuel is possible. The present engine does not swing much in operation. Because it is simple in construction, the present engine is inexpensive, and will not easily get out of order.

What is claimed is:

1. A prime mover comprising:
   a rotor having a compressor rotor part and a prime mover rotor part and a common shaft on which said rotor parts are mounted, the center of said rotor having a vane groove extending radially therethrough;
   a vane movably mounted in said vane groove and constituted by two vane parts opposed to each other at the center of the vane in the radial direction thereof;
   a compressor casing in which said rotor is rotatably mounted, said compressor casing having a lower inner wall part with a cross-sectional shape of part of a circle and with which said compressor rotor part is coaxially rotatable in close contact therewith, and an upper inner wall part with a cross-sectional shape of part of a shape which is approximately elliptical and the center of which is offset from the center of the circular cross-sectional shape in a direction away from said lower inner wall part, said vane having a diametrical dimension equal to the dimension across the elliptical cross-sectional shape through the center of the circular cross-sectional shape and perpendicular to the direction of the offset, said approximately elliptical cross-sectional shape having the diametrical dimensions through the center of the circular cross-sectional shape substantially equal to the diametrical dimension of said vane, and said upper inner wall part being at least the part of the entire inner wall which is on the side of center of the circular cross-sectional shape in the direction of offset of the center of the elliptical shape;
   said compressor casing having a gas inlet opening through the upper inner wall part thereof;
   a prime mover casing axially adjacent said compressor casing and having lower and upper inner wall parts similar in shape and in corresponding positions to the inner wall parts of said compressor casing, said prime mover rotor being coaxially rotatable in close contact with the lower circular cross-section shaped inner wall part of said prime mover casing;
   ignition means in said prime mover casing directed into the space within said upper inner wall part thereof;
   said prime mover casing having an exhaust port opening out of the upper inner wall part thereof;
   a plate spring between said vane parts and urging said vane parts radially outwardly away from each other for improving the gas tightness between said vane parts and the inner walls of said casings;
   means in the casing engaging said vane for limiting the radially outward movement of said vane; and
   said rotors having two passages therein and extending between said compressor casing and said prime mover casing for conveying combustion gas from said compressor casing to said prime mover casing, there being one passage on each diametrically opposite side of said vane and being parallel with said vane groove and opening out of substantially diametrically opposite parts of the peripheries of said rotors, at least one end of said passage means being closed when the part of the periphery of said rotor from which it opens rotates in said lower parts of said casings and being opened when said part of the periphery of said rotor rotates in said upper parts of said casings.

2. A prime mover as claimed in claim 1, in which said vane engaging means comprises intermediate walls extending radially inwardly of said casings from adjacent the opposite ends of the respective casings and toward said rotors, said intermediate walls defining vane guide chambers between the ends of said casings and the intermediate walls, said vane guide chambers having inner walls with an approximately elliptical cross-sectional shape the same as the shape of the approximately elliptical shape of which the upper inner wall parts are a part, said vanes having vane guide portions on the ends thereof toward the ends of said casings and extending into said vane guide chambers and having the diametrically opposite ends rotating in close contact with said inner walls of said vane guide chambers while said rotors are rotating.

3. A prime mover as claimed in claim 1 in which the approximately elliptical shape is a shape the respective diametrical dimensions of which are the diametrical dimensions of an ellipse having the formula:

$$(b^2-c^2)x^2+b^2y^2=b^4$$

where x is the long axis of the ellipse, y is the short axis, 2b is the length of the short axis and c is the amount of offset, less a distance δ which is equal to:

$$\delta = 2b \left\{ \sqrt{1 + \frac{c^4 \tan^2\theta}{(b^2 + b^2\tan^2\theta - c^2)^2}} - 1 \right\}$$

where $\theta$ is the angle in radians between the vane and the x axis of the ellipse.

* * * * *